(12) United States Patent
Sunay et al.

(10) Patent No.: US 8,594,132 B2
(45) Date of Patent: Nov. 26, 2013

(54) QUALITY OF SERVICE COGNIZANT SCHEDULER FOR FEMTOCELL BASE STATIONS

(75) Inventors: M Oguz Sunay, Istanbul (TR); Bulent Kaytaz, Istanbul (TR)

(73) Assignee: Argela Yazilim ve Bilisim Teknolojileri San. ve Tic. A.S. (TR)

( * ) Notice: Subject to any disclaimer, the term of this patent is extended or adjusted under 35 U.S.C. 154(b) by 184 days.

(21) Appl. No.: 13/109,568

(22) Filed: May 17, 2011

(65) Prior Publication Data

US 2012/0294161 A1 Nov. 22, 2012

(51) Int. Cl.
H04J 3/18 (2006.01)
G01R 31/08 (2006.01)

(52) U.S. Cl.
USPC .......................................................... 370/477

(58) Field of Classification Search
None
See application file for complete search history.

(56) References Cited

U.S. PATENT DOCUMENTS

| 6,449,940 | B2 | 9/2002 | Nagel |
| 6,728,208 | B1 * | 4/2004 | Puuskari ..................... 370/230.1 |
| 7,230,991 | B2 | 6/2007 | Sang et al. |
| 7,298,719 | B2 | 11/2007 | Andrews et al. |
| 7,349,338 | B2 | 3/2008 | Balachandran et al. |
| 7,463,631 | B2 | 12/2008 | Bao et al. |
| 7,596,089 | B2 | 9/2009 | Bi et al. |
| 7,734,805 | B2 | 6/2010 | Balachandran et al. |
| 7,768,973 | B2 | 8/2010 | Zhu et al. |
| 2002/0044527 | A1 * | 4/2002 | Jiang et al. ..................... 370/229 |
| 2008/0170508 | A1 * | 7/2008 | Popiak et al. .................. 370/252 |
| 2009/0279430 | A1 * | 11/2009 | Huber et al. ................ 370/230.1 |
| 2009/0288139 | A1 * | 11/2009 | Huber et al. ....................... 726/2 |

FOREIGN PATENT DOCUMENTS

EP 1273140 B1 * 1/2008 .............. H04L 12/56

OTHER PUBLICATIONS

Shakkottai et al., "Scheduling for Multiple Flows Sharing a Time-Varying Channel: The Exponential Rule," American Mathematical Society Translations, Series, vol. 2, 2000, 19pgs.

* cited by examiner

Primary Examiner — Chirag Shah
Assistant Examiner — Rina Pancholi
(74) Attorney, Agent, or Firm — IP Authority, LLC; Ramraj Soundararajan (57) ABSTRACT

A method and system are provided to schedule the transmissions to a plurality of applications for a plurality of users connected to a femtocell taking into account the quality of service (QoS) requirements of each application served while maintaining an efficient use of the wireless radio resources as well as a user and application weighted notion of fairness of service reception. The scheduler differentiates between not only different users but also between applications of each user, and schedules data transmission amongst these applications so that QoS requirements for all applications are satisfied.

11 Claims, 7 Drawing Sheets

QUALITY OF SERVICE COGNIZANT SCHEDULER FOR FEMTOCELL BASE STATIONS

BACKGROUND OF THE INVENTION

I. Field of the Invention

The present invention relates to scheduling transmissions for multiple applications of multiple users from a femtocell base station in a wireless communication system. The scheduling takes the quality-of-service (QoS) requirements of the different applications into account.

II. Description of the Related Art

Scheduling in Wireless Cellular Data Networks

Following the rapid increase of the Internet use and IP-based data applications, wireless systems now support a wide variety of data services as well as voice. Such services have grown very popular, thereby increasing the load on wireless systems. Additionally, the heterogeneity of QoS requirements of these services results in significant difficulties in providing good service.

Wireless systems have utilized the bursty nature of data communication as well as the geographical distribution of its users across a cell to increase the overall spectrum efficiency, as well as peak and average user data rates. This is accomplished by the utilization of multiuser diversity in which data access is provided only to a subset of the active users at a given time based on the regular channel quality feedback received from all users. In multiuser diversity, system resources are used towards sending data to users whose channel qualities are relatively good, thereby increasing the spectrum efficiency. A scheduler is used to decide which users to service at a given time. The sum-rate capacity maximizing scheduler (usually referred to as the Maximum Carrier-to-Interference Ratio (Max C/I) Scheduler) schedules service to the user with the best channel condition at a given time. Coupled with adaptive coding and modulation, the scheduled user is then serviced with the highest possible data rate it can successfully receive during the allotted time. However, this scheduler is unfair as it heavily favors users that are closer to the base station since a closer proximity to the base station results in better channel conditions for such users. Actually, a stationary user near the cell boundary may starve for service if this scheduler is used. There have been numerous efforts in the literature to develop fair schedulers for wireless packet data networks. One such scheduler, the proportional fair (PF) scheduler, as introduced in the U.S. Pat. No. 6,449,490, tries to maintain a balance between the conflicting goals of maintaining a near-optimal network sum-rate capacity and allowing all users a fair access to system resources. The PF scheduler keeps track of the average data rate observed by each active user over a given time period and ranks users relative to the ratio of their potential service data rate (if scheduled) to their average data rate. The top ranked user(s) are then scheduled for service. Mathematically, at a given time n, the PF rule schedules service for user i provided that $$\max_i \frac{ChC_i(n)}{F_i(n)} \qquad (1)$$

Here, $ChC_i(n)$ is the instantaneous channel condition for user i at time n, $F_i(n)$ is the average channel condition for user i at time n over a pre-specified period of time. The instantaneous channel condition may be either the C/I ratio of the channel, or the corresponding instantaneous achievable transmission data rate for a given packet error rate. Similarly, the average channel condition may be either the average C/I ratio or the average observed data rate for the user in question. The preferred embodiment for the PF rule is to use the ratio of the instantaneous achievable transmission rate to the average observed data rate for each user. This way, a user which observes poor channel conditions most of the time can also get service at times where its relative channel quality with respect to its own average is high. It has been shown that the PF scheduler gives equal system resources to users who only differ in the distance from the base station, their channel fading characteristics being the same. Different variants and generalizations of the PF rule have been proposed as well. For example, U.S. Pat. No. 7,463,631 incorporates a priority function to the PF rule, and U.S. Pat. No. 7,230,991 introduces a so-called "alpha" parameter to the PF rule to adaptively migrate between the Max C/I and PF rules. Similarly, U.S. Pat. No. 7,596,089 defines a generalized PF rule, where user i is scheduled whenever $$\max_i \frac{ChC_i(n)}{F_i(n)} \frac{h(ChC_i(n))}{ChC_i^{avg}} \qquad (2)$$

Here, $ChC_i^{avg}$ is the average achievable data rate, as reported by the user and $h(ChC_i(n))$ is a function of user i's instantaneous achievable data rate at time n if it gets scheduled. The patent describes a number of different such functions which result, in addition to the regular PF rule, new rules where scheduling is conducted such that user throughputs are proportional to the variations of their requested rates.

One documented shortcoming of the PF scheduler has been its inability to ensure queue stability at the base station. In other words, it is possible for the queues to grow without bounds under the PF rule. The exponential scheduler, described in the article "Scheduling for Multiple Flows Sharing a Time-Varying Channel: The Exponential Rule" in the American Mathematical Society Translations introduces an exponential function of the queueing delay for the head-of-line packet destined for each user to remedy this problem. Similarly, U.S. Pat. No. 7,768,973 conducts scheduling for an OFDMA wireless system using a Lagrangian optimization of the proportional fairness term at each time slot using user specific data rate constraints. These constraints in turn, provide a solution to the stability problem of the PF rule.

Most schedulers in the literature have focused their attention on maintaining a good balance between maximizing the sum-rate network capacity and user fairness. However, such algorithms do not attempt to satisfy the heterogeneous quality-of-service (QoS) requirements of the individual users. A few recently proposed scheduling rules remedy this problem by incorporating user specific QoS parameters into the scheduling decision directly. Most common QoS parameters that have been used so far are minimum average data rate, minimum instantaneous data rate, and minimum delay of the user packets to be transmitted.

So far, a number of token-based solutions have been proposed to take the QoS parameters into account. Here, a user specific token counter is introduced which is incremented at every scheduling interval and is decremented whenever the user is scheduled. The amount by which the token count is incremented/decremented is service specific. For example, U.S. Pat. No. 7,298,719 proposes to incorporate into the PF rule a multiplicative exponential token term. Mathematically, at a given time n, this rule schedules service for user i provided that $$\max_i \frac{ChC_i(t)}{F_i(t)} e^{\alpha_i T_i(n)} \quad (3)$$

Here, Ti(n) is the token count for user i at time n and $a_i$ is an adjustable parameter. Therefore in this rule, any user for which the token count from the desired QoS is largest may get scheduled, despite its PF ratio rank since the exponential term would dominate. Similarly, U.S. Pat. No. 7,349,338 proposes a token count that tracks the user's achieved performance relative to a target minimum throughput. This token count is subsequently used in determining which user(s) to service. Additionally, U.S. Pat. No. 7,734,805 describes a user specific Satisfaction Metric and a Dissatisfaction Metric which are incorporated in scheduling decisions. These metrics are in fact two different token counts for each user where the token amount describes the amount of satisfaction/dissatisfaction of each user regarding the QoS of the service it is currently subscribed.

To accommodate for QoS requirements, U.S. Pat. No. 7,463,631 proposes a modification to the PF rule. Here, $F_i(n)$ in (1) is replaced by a term that relates to not the actual average user throughput, but rather the projected user throughput, which is dictated by the user priority and/or QoS requirements.

In all of the above prior art schedulers, each user's data is placed into a user specific buffer. Based on the feedback received from the user on channel quality as well as the fairness criterion, the base station decides which user(s) to service at a given time instance. In this set up, a limited QoS support may be possible since associated with each user's head of buffer packet, a QoS parameter may exist. A scheduler may incorporate this QoS parameter in its decision making as well. While service differentiation across different users may be possible this way, differentiation amongst various applications of a given user is still not possible.

Wireless Femtocell Networks

In cellular networks, it is known that a significant percentage of the calls and the majority of the data services are requested when the user is indoors. Then, it is extremely important for mobile operators to provide good indoor coverage for both voice and data.

The traditional approach to providing indoor coverage is to use the outdoor macrocells. Here each base station location, transmit power as well antenna configuration are set so that coverage in the cell, both outdoors and indoors, is acceptable. While this approach is the current solution, it has a number of serious drawbacks. For one, it is very expensive to use an outside-in approach for indoor coverage. This is because, especially for the radio frequencies of 3G, LTE and beyond, the signal attenuation is dramatically high when it goes through the building walls. Therefore, an indoor user, for the same grade of service, will require a much higher power allocation from the base station compared to an outdoor user. This is return, results in a much lower cell throughput, as less power is left for the provision of service to other users. Second, higher data rates in 3G, LTE and beyond are possible via the use of high order modulation and coding, which in return, require high, observed channel qualities. An indoor user, due to the above mentioned penetration losses, is more unlikely to observe such channel qualities. Therefore, provisioning multimedia services that require stringent QoS requirements is less likely indoors.

To alleviate these shortcomings, a solution that involves an indoor unit serving indoor users has been proposed. Femtocells, also known as home base stations are developed as cellular network access points that connect regular mobile users to a cellular operator's network over the Internet, using residential DSL, cable, broadband connections, optical fibres or wireless last-mile solutions.

The femtocell unit incorporates the functionality of a typical base station and also a radio network controller. It is connected to the cellular operator's core network via the Internet. Femtocells are envisioned to be consumer devices and as such may be self-deployed by users rather than operators. In order to generate minimum interference to outdoor macrocells and neighboring femtocells, a femtocell base station must be able to configure itself automatically.

Conventionally, femtocell base stations are configured to treat users in one of two ways. In the first configuration, the femtocell base station acts as an extension to the existing macrocellular network and provides enhanced network coverage and capacity for all users in range of the femtocell base station. In a residential context, this means that the femtocell base station will provide access to the network for those resident in that location, as well as for neighbors and passers-by if the macrocellular coverage is poor. In this configuration, all users are considered to be part of an open subscriber group, and the use of the femtocell base station is not restricted to any particular set of users. This configuration is usually referred to as a "open access femtocell." In the second configuration, the femtocell base station restricts access to the network to a defined set of subscribers. This configuration is usually referred to as a "closed access femtocell." A hybrid configuration is also possible.

QoS Cognizant Femtocells

An indoor user connected to the cellular operator's network via a femtocell is much more likely to request multiple, parallel data services, each potentially requiring different QoS constraints. The cellular operator needs to satisfy such demands.

As described above, the current "outside-in" approach in 3G, LTE, WiMaX and beyond, makes use of a user-based scheduler for the provision of data to users. A number of the QoS-sensitive scheduling rules that have appeared in the literature have been summarized above. It should be noted here that all of the scheduling rules that have been described so far have been user-based. In other words, the goal has been to equitably, fairly divide the system resources amongst users via a scheduler so that system throughput is as high as possible and, for some schedulers, user-specific QoS constraints are taken into account. This approach is understandable. For one, the fundamental theory behind making high data rates in cellular networks a reality has been the use of multi-user diversity. This idea makes use of the user geographic variation in a typically kilometer-radius cell as well as the channel quality variation in time. By allowing a bursty transmission of data, multi-user diversity achieves high data rates on the average. Second, a typical cellular user is mobile, and the likelihood of such a user to request multiple, parallel data services may not be very high.

However, the scenario is dramatically different for an indoor user. When a femtocell is deployed indoors, its coverage area is much smaller in radius than a outdoor cell. Additionally, the typical number of users connected to a femtocell base station at a given time is likely to be much lower than those connected to a macrocell base station. Furthermore, these fewer users are much more likely to demand multiple, parallel data services at a given time. In this scenario, a different resource allocation scheduling needs to be developed for a femtocell base station.

When multiple applications are active for a given user, the prior art schedulers do not attempt to differentiate between them. The incoming traffic to the base station destined for the users is simply queued in user-specific buffers as they arrive, even if they belong to different applications. If the prior art scheduler uses a QoS-aware rule, for a given user, a single QoS level is set, and all incoming traffic for this user is treated according to this level. When a good percentage of the users have multiple active applications with differing QoS requirements, the user based prior art schedulers may become inefficient. If for example, a user has an active streaming video application as well as an active download application that downloads a large file, the QoS level for this user will be set by the system based on either of these applications. If the setting is according to the video streaming application, then the user will impose a very large burden on the system since the incoming traffic for this user, which is a sum of the streaming video packets and the download file packets, will be treated as if they are all delay and jitter sensitive and have a pre-set minimum average data rate. This, in turn, will unfairly steal system resources from other users that have less stringent QoS requirements. If, on the other hand, the setting is according to the download application, the streaming video application will most likely be experienced at an unacceptable quality level. Since femtocell users have very low, if any, mobility, and are consequently likely to have multiple active applications running, some, but not all which are QoS sensitive, the prior art schedulers will not be very suitable for a femtocell base station.

To our knowledge, there has been no prior art in a scheduler design for a femtocell base station.

SUMMARY OF THE INVENTION

This patent discloses a method and system to schedule the use of system resources of a femtocell across a plurality of applications and users. The method and system includes differentiating the data traffic among different applications and users. The scheduler in the disclosed method and system not only differentiates between different users but also between different applications of each user, and schedules data transmission amongst these applications so that QoS requirements for all applications are satisfied. Scheduling of system resources are conducted regularly at periods of a pre-defined time slot.

The system of this invention is a new scheduler subsystem of the femtocell base station that recognizes application types of the incoming traffic and enables applications with more strict quality of service requirements to potentially get higher precedence regardless of that user's proximity to the femtocell base station. In this invention, this is made possible by deploying multiple buffers for each user, one per each of its active application (or application type) that needs a different QoS treatment. The system of this invention then differentiates the incoming traffic of each user using techniques such as deep packet inspection, traffic pattern, average inter-packet arrival time difference and average packet size-based application estimation, or explicit notification if this is made available in the system, so that data packets for each active application (or application type) are queued in the corresponding correct buffer. The scheduler subsystem then allocates the system resources at a given time amongst the plurality of active applications of all users to a subset of these applications such that some or all of the below goals are satisfied:
1. The pre-set user and/or application priorities are met,
2. The QoS requirements of all active applications are satisfied to the maximum ability of the femtocell base station under the current user channel conditions and femtocell base station scheduler priority settings,
3. Some level of fairness is met amongst all users and/or applications that have the same priority.
4. The sum-rate throughput of the femtocell base station is as high as possible.

At that given time, the head-of-line packets of the scheduled applications are transmitted to the corresponding mobile user device by the femtocell base station.

Let there be n active users connected to the femtocell base station. Furthermore, let user n have $A_n$ parallel active applications (or application types) for which data transfer from the femtocell base station to the mobile station is seeked. Then, the preferred embodiment of this invention allocates $n \times A_n$ parallel buffers, one for each application (or application type) of each user. The disclosed invention describes a scheduler in the femtocell base station that allocates the system resources amongst $n \times A_n$ different data queues so that the above stated goals are satisfied at each scheduler decision. The system resources depend on which cellular communication system is being used. In general, one or more of the femtocell base station transmit power, transmission code space (if a CDMA based system is used), antennas (if the base station is furnished with multiple antennas), and available bandwidth (if an FDMA, multi-carrier or OFDMA based system is used) are dynamically allocated in time to the active applications of active users by the scheduler. The scheduling is conducted at regular intervals of a cellular system defined time slot. At a given time, the scheduler may allocate system resources to a subset of all active applications. Thus, not all applications are necessarily serviced at each scheduling interval. In other words, the active services receive data packets in a bursty fashion.

One preferred embodiment of the disclosed invention schedules those application(s) at each scheduling interval so that the goals of satisfaction of QoS requirements of each active application served by the femtocell base station, user and application priority level scaled fairness of service, and the femtocell base station sum throughput are jointly maximized using multiple objective optimization. In other words, the scheduled application(s) and the division of system resources amongst the scheduled applications (if there is more than one scheduled application) is decided so that a best compromise solution that has the smallest Euclidean distance from the Utopia Point is met.

In another preferred embodiment, the scheduler sub-optimally schedules which applications to serve and the division of resources amongst the scheduled applications according to an application rank, which is calculated at each scheduling interval according to a nonlinear function of one or more of the QoS requirements (maximum instantaneous and average data rates, minimum instantaneous and average data rates, average and maximum packet delays, estimated (or exact if the system allows for a feedback) buffer fullness levels at the user end), current QoS satisfaction or dissatisfaction levels (which could be measured using a token counter, a satisfaction/dissatisfaction metric, or any other metric that measures the deviation from the desired level), observed channel qualities (or the achievable data rate) for each user, and average channel qualities (or average observed data rate) for each application. In other words, at scheduling interval k, the priority rank of user i's n'th application is calculated using, $$R_{i,n}(k) = f(QoSu_{i,n}(k), PriL_{i,n}(k), SL_{i,n}(k), DSL_{i,n}(k), ChR_i(k), ChR_{i,n,ave}(k)) \quad (4)$$

Here, f is some nonlinear function, $QoS_{i,n}(k)$ is the current QoS requirements of user i's n'th application, $PriL_{i,n}(k)$ is the current priority level of user i's n'th application, $SL_{i,n}(k)$ and $DSL_{i,n}(k)$ are the current satisfaction and dissatisfaction levels of user i's n'th application, respectively, $ChR_i(k)$ and $ChR_{i,n,ave}(k)$ are user i's current channel condition (or achievable data rate) and user i's n'th application average channel condition (or average observed data rate), respectively. In all of the above statements, averaging is performed using a sliding window over a pre-defined period of time.

The patent also discloses a method and system where some aspects of the scheduling rule for the femtocell base station may be user controlled. The control may be using a web interface, similar in fashion to the control of the ADSL, WiFi modems and may also be further integrated into other computer programs such as a Calendar Program. This interface allows the user to dynamically change priority levels and/or minimum QoS parameter settings for the traffic of different users and/or traffic of different applications. Furthermore, this interface allows the users to schedule alterations to the user and/or application priority and QoS-handling settings in the scheduling rule so that QoS-aware service reservations for a specified user and/or application may be possible for a given duration of time.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings.

In the following description, in accordance with the present invention, a cellular communication system that includes femtocell base stations provides a QoS (quality-of-service) on a desired level to active applications of users connected to the system via a femtocell base station. More specifically, the present invention relates to the QoS requirements of a given application, scheduling by a scheduler residing in the femtocell base station, assignment of a radio traffic channel taking these into consideration, and transmission of data at different data rates whereby the instantaneous rates are dictated by the channel quality of the user(s) of the scheduled application(s). The scheduler in a femtocell base station constituting a TDM-based cellular communication system can perform such an invention. As such, cellular systems following the standards such as IS-2000, WCDMA, UMTS, CDMA2000, 1xEV-DO, 1xEV-DV, LTE, LTE Advanced where femtocells are deployed may use this invention. The invention is also applicable to all future cellular communication standards where data communication is TDM-based and system resources of a common radio channel are shared amongst a plurality of users having a plurality of active applications serviced by a femtocell base station.

Figure 1:
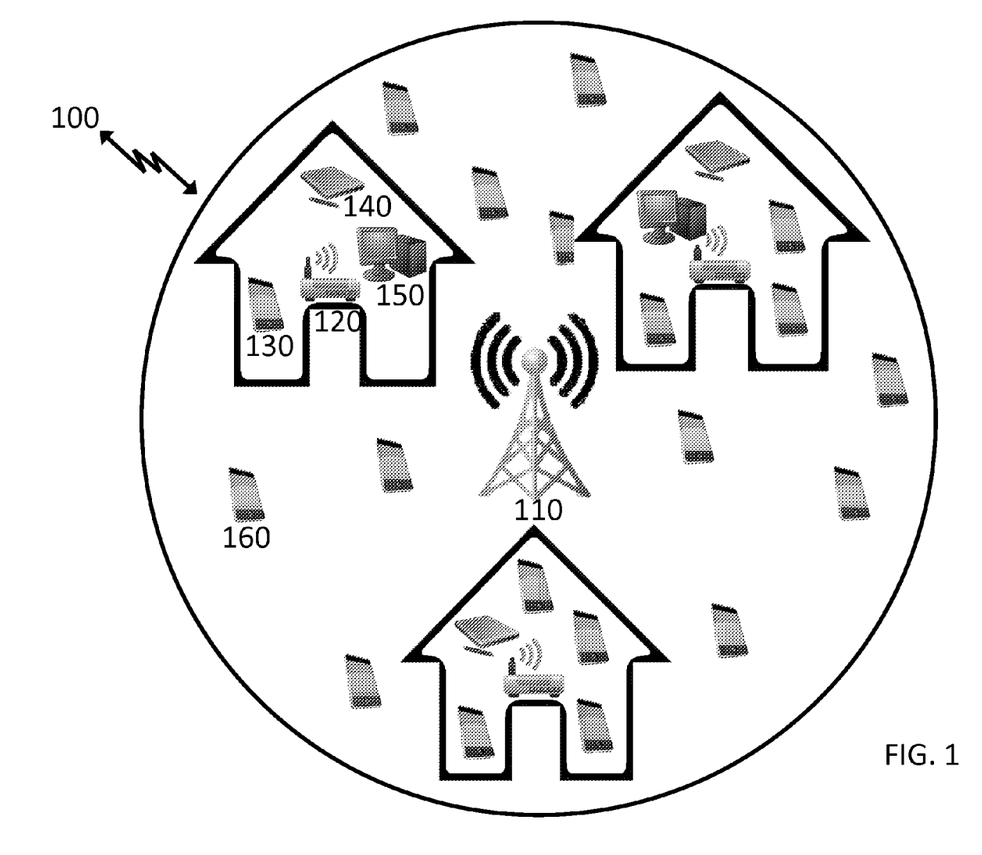
FIG. 1 illustrates a network configuration of a cellular system in which femtocell base stations are placed for indoor user.

FIG. 1 refers to a generalized network configuration of a cellular communication system where one macrocell 100 of a cellular communication system serviced by a base station 110 to which the present invention is applied is illustrated. Such a cellular communication system provides a mobile user with voice as well as packet data services. The cellular communication system includes femtocells, each having a femtocell base station 120 and indoor users 130, 140, 150 serviced by this femtocell base station and outdoor users 160 serviced by the cellular base station 110. The femtocell base station 120 may be closed access, open access, or hybrid. If the femtocell base station is open access, users will be serviced by the femtocell base station 120 only if the received signal strength received from this base station is the largest amongst the plurality of signals from all neighboring cellular base stations and other femtocell base stations. If the femtocell base station is closed access or hybrid, the femtocell base station may service the users in the subscriber list even when the received signal strength from this base station is not the largest. If the femtocell is closed access, users that are not in the subscriber group will always be serviced by either the cellular base station or a neighbouring open access or hybrid femtocell even if the received signal strength from the closed access femtocell base station is the largest.

Figure 2:
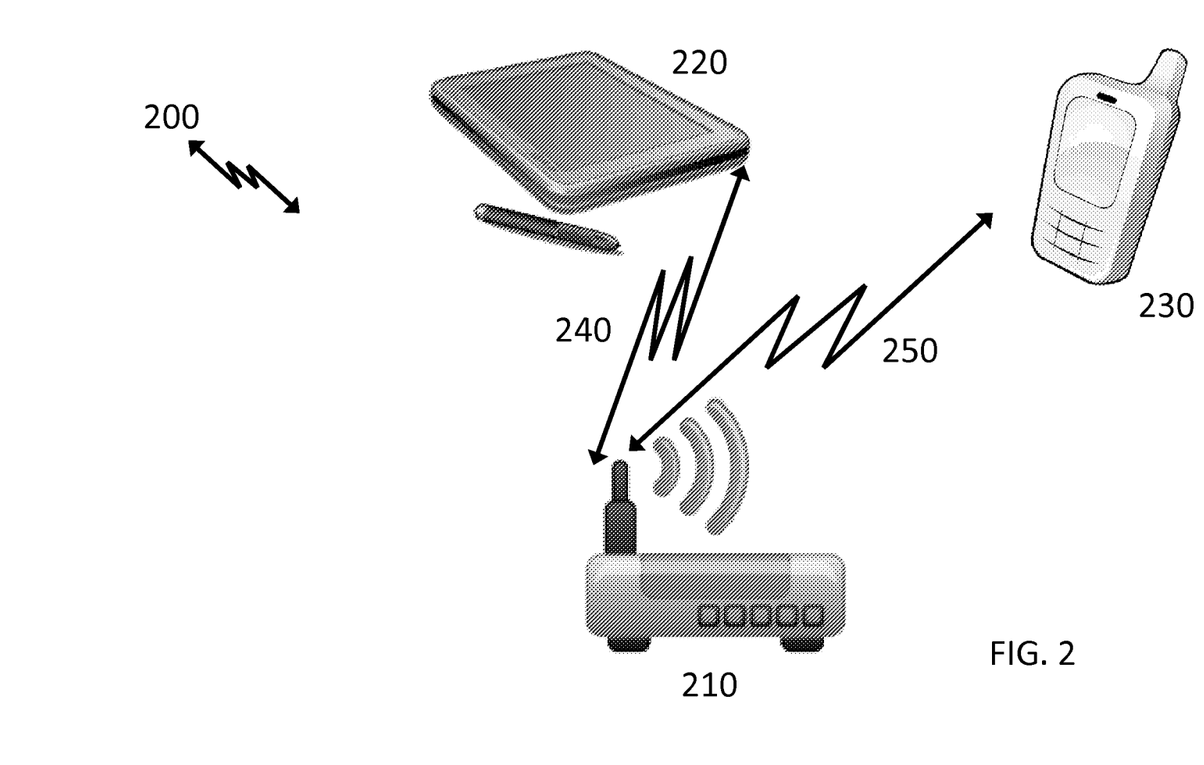
FIG. 2 illustrates a femtocell base station serving users that are in different geographical locations.

In such a cellular communication system, users that are serviced by the femtocell base station 120 are potentially geographically distributed inside the femtocell. This is illustrated in FIG. 2. Here, femtocell 200 is serviced by the femtocell base station 210 and users 220 and 230 actively request service. The channel 240 between femtocell base station 210 and user 220 as well as the channel 250 between the femtocell base station 210 and user 230 are wireless, and therefore undergo typical wireless channel impairments, such as path loss, wall penetration loss, multipath fading, shadow fading as well as Doppler spread. Furthermore, these channels are time-varying.

Figure 3:
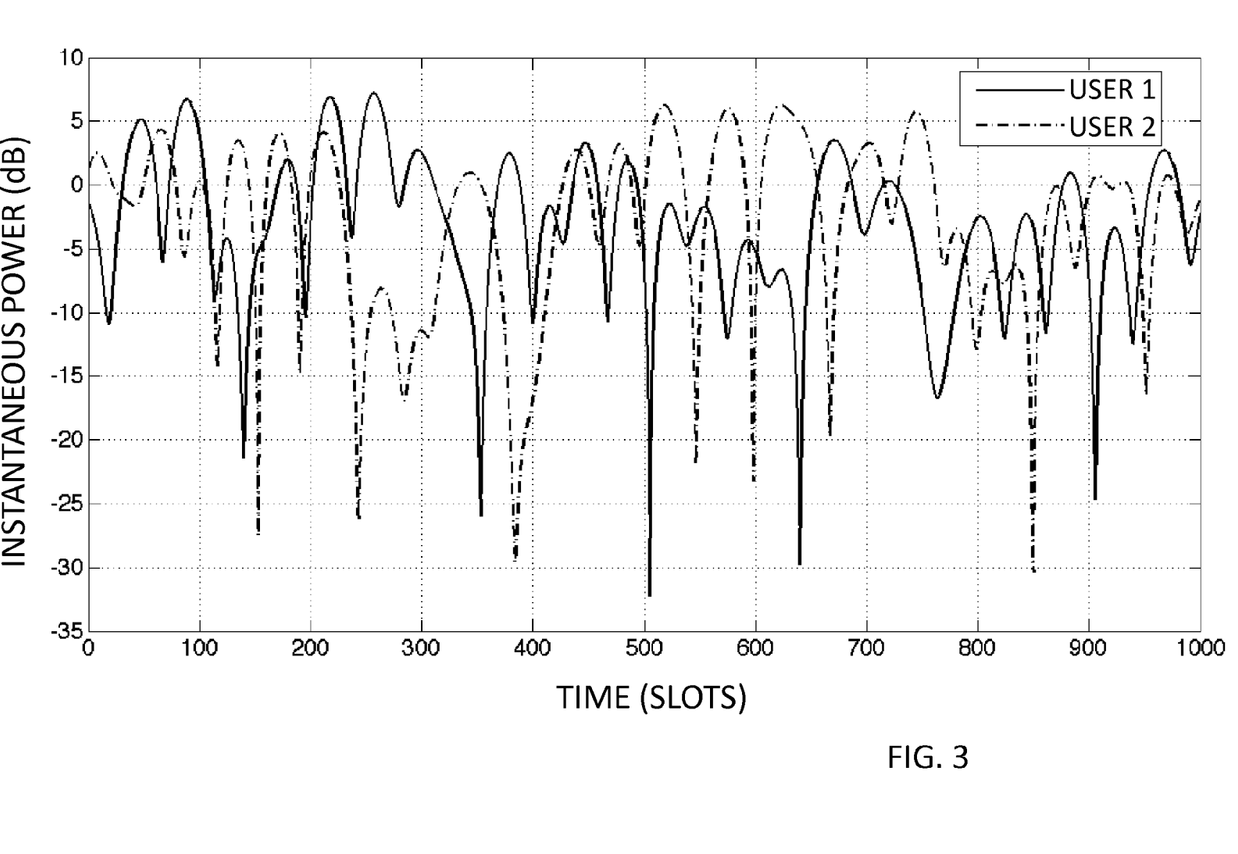
FIG. 3 illustrates the representative wireless channel characteristics for two users that seek service from a femtocell base station.

FIG. 3 illustrates typical time-variations of the channels 240 and 250 of femtocell users 220 and 230, respectively from FIG. 2. As observed, channels 240 and 250 experience variations in the channel strengths with time and these variations are, to a large extent, independent. However, the users 220 and 230 may have multiple active applications at a given time. It should be noted here that, all of the active applications of a given user experience exactly the same channel conditions.

Figure 4:
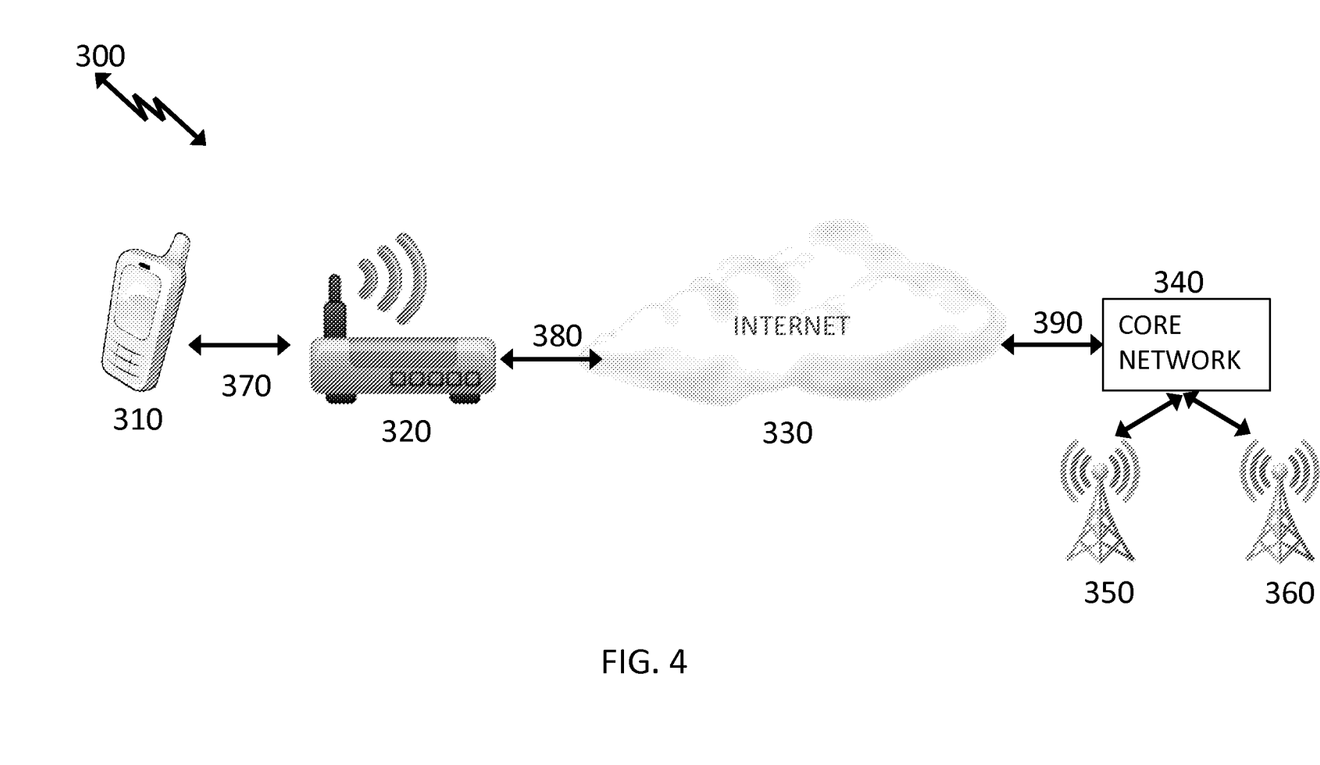
FIG. 4 illustrates how the femtocell base station is connected to the cellular operator's core network.

FIG. 4 illustrates how data for an active application of a femtocell user 310 is carried from the cellular core network to the user. The femtocell base station 320 is directly connected to the Internet 330 via a link 380 such as an ADSL connection, cable, broadband connection, optical fibre or a wireless last-mile solution. The cellular core network has an Internet gateway with link 390 to the Internet. The cellular network has cellular base stations 350, 360 that may be covering a geographical area that includes the femtocell 300. The femtocell 320 has both a control-plane as well as a data-plane connection to the cellular core network via the Internet 300. The control-plane connection enables system specific messaging between the femtocell base station 320 and the core network, such as those during a call setup, handoff etc. The data-plane connection allows for the data transfer to/from the mobile user 310 from/to the cellular core network via the femtocell base station 320.

Figure 5:
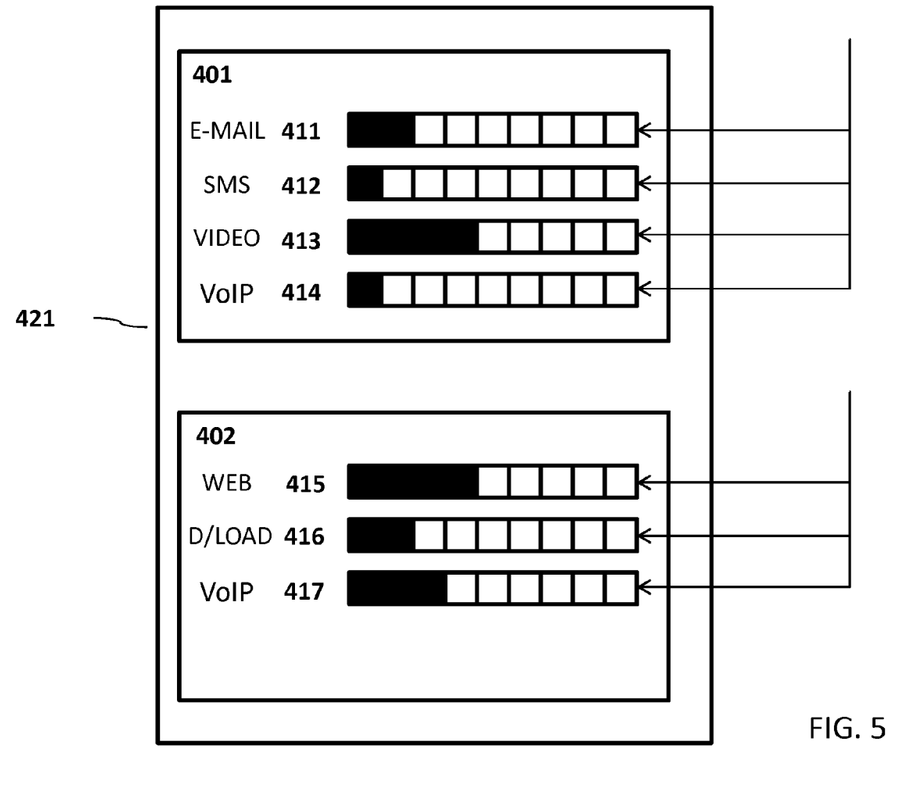
FIG. 5 illustrates a detailed structure of the application specific buffers in the femtocell base station for the disclosed invention.

FIG. 5 illustrates the sub-unit 421 of the femtocell base station where buffers are stored for each active application of each active user. The incoming traffic to the femtocell base station consists of data packets for all active applications of all active users. The illustration displays two of such possible users, 401 and 402, 401 having an active e-mail application 411, active messaging application 412, active video application 413 and an active voice over IP application 414. Similarly, in the illustration, user 402 has an active Web application 415, an active download application 416, and an active voice over IP application 417.

Upon arrival, the femtocell base station differentiates each packet based on its destination address (mobile user) as well as application (or application type). The femtocell base station may be explicitly notified regarding the application type (or application class). If this is not available, the femtocell base station may use one or more of the many available techniques to enable this differentiation. Such techniques include, but not limited to, use of source address, deep packet inspection, and estimation based on traffic pattern, average inter-packet arrival time difference and average packet size. Once user and application based data differentiation is accomplished, the femtocell base station may divide the data packets into physical layer packets whose sizes are dictated by the cellular communication system in use. These packets are subsequently queued in the appropriate buffers. The head-of-line packets of the scheduled applications are transmitted over the common transmission channel at the next time interval.

Figure 6:
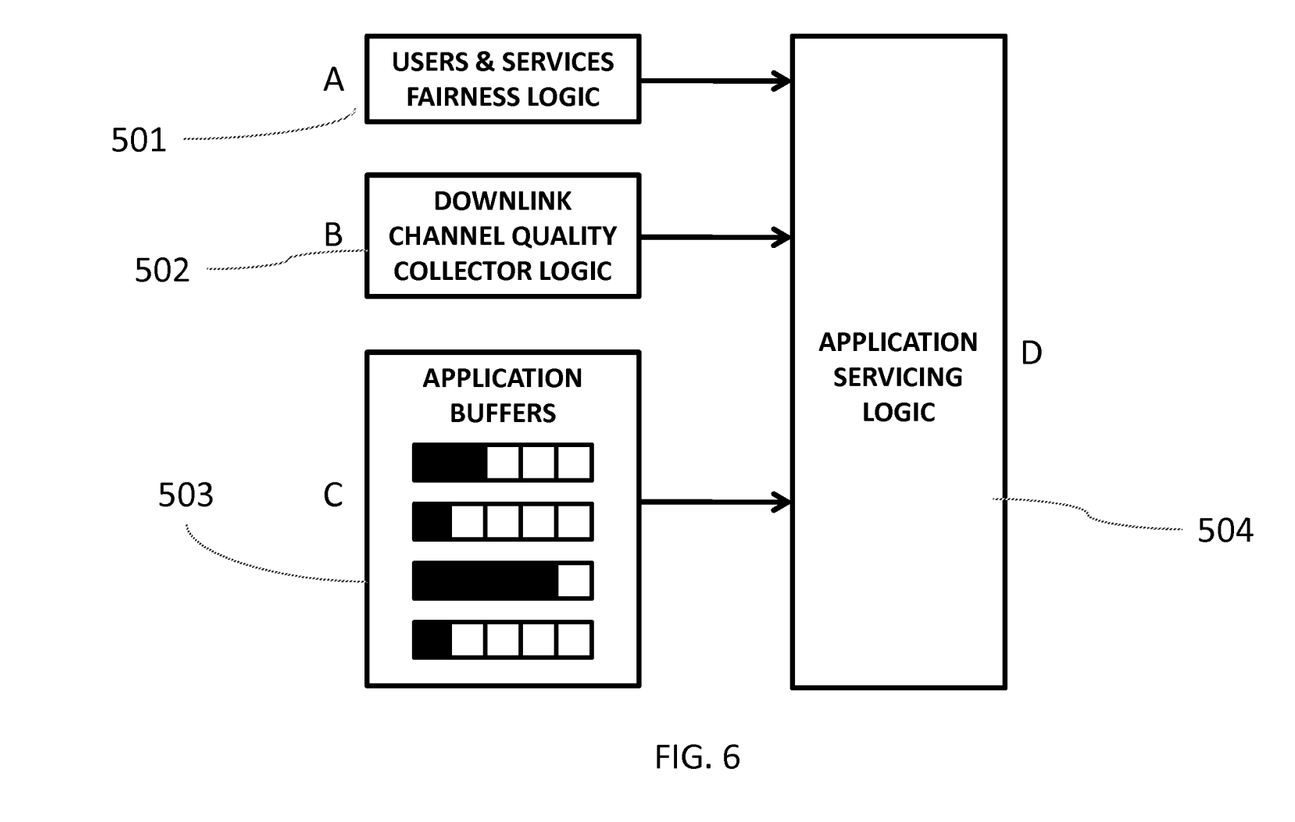
FIG. 6 illustrates the scheduler subsystem inside the femtocell base station in the disclosed invention.

FIG. 6 illustrates the block diagram of the scheduler system in the femtocell base station for the present invention. The scheduler is composed of 4 logical units, a user and application fairness logic, 501, a downlink channel quality (or achievable data rate) collection logic, 502, the buffers for the active applications, 503, as well as the intelligence unit, 504, which decides which services to serve and how to divide the system resources amongst these applications at each scheduling interval. The downlink channel quality collector logic 502 in the femtocell base station receives instantaneous channel quality indicators (which may be in the form of achievable data rates) from every active user prior to each scheduling interval. The downlink channel quality collector logic 502 in the femtocell base station also keeps track of the average channel quality (which may be in the form of average observed data rates) for each active user, where averaging is handled using a sliding window over a pre-defined duration of time. The user and application fairness logic 501 keeps a record of the current QoS requirements of all active applications, the current user (or cellular operator) set priority levels of all active users and applications, as well as the current satisfaction and/or dissatisfaction levels for all of the applications. One of the goals of the disclosed invention is to satisfy a fair service to all active applications where fairness is measured in terms of the relative satisfaction and/or dissatisfaction levels with user and application level priorities and QoS levels set as constraints. The application buffers 503 provide a queue for the application data packets. Each queue is a first-in-first-out (FIFO) queue where the head-of-line packets leave the queue for over the air transmission whenever the corresponding application is scheduler by the intelligence logic, 504.

One preferred embodiment of the disclosed invention has an intelligence unit 504 that decides which application(s) to serve and how to divide the system resources amongst them so that the goals of satisfaction of QoS requirements of each active application, user and application priority level scaled fairness of service, and the femtocell base station sum throughput are jointly maximized using multiple objective optimization. Here, 504 decides on the scheduled application(s) and if necessary, the corresponding division of system resources amongst the scheduled applications, so that a best compromise solution that has the smallest Euclidean distance from the Utopia Point is met.

In another preferred embodiment, the intelligence unit 504 sub-optimally schedules which applications to serve and the division of resources amongst the scheduled applications according to an application rank, which is calculated at each scheduling interval according to a nonlinear function of one or more of the QoS requirements (maximum instantaneous and average data rates, minimum instantaneous and average data rates, average and maximum packet delays, estimated (or exact if the system allows for a feedback) buffer fullness levels at the user end), current QoS satisfaction or dissatisfaction levels (which could be measured using a token counter, a satisfaction/dissatisfaction metric, or any other metric that measures the deviation from the desired level), observed channel qualities (or the achievable data rate) for each user, and average channel qualities (or average observed data rate) for each application.

Figure 7:
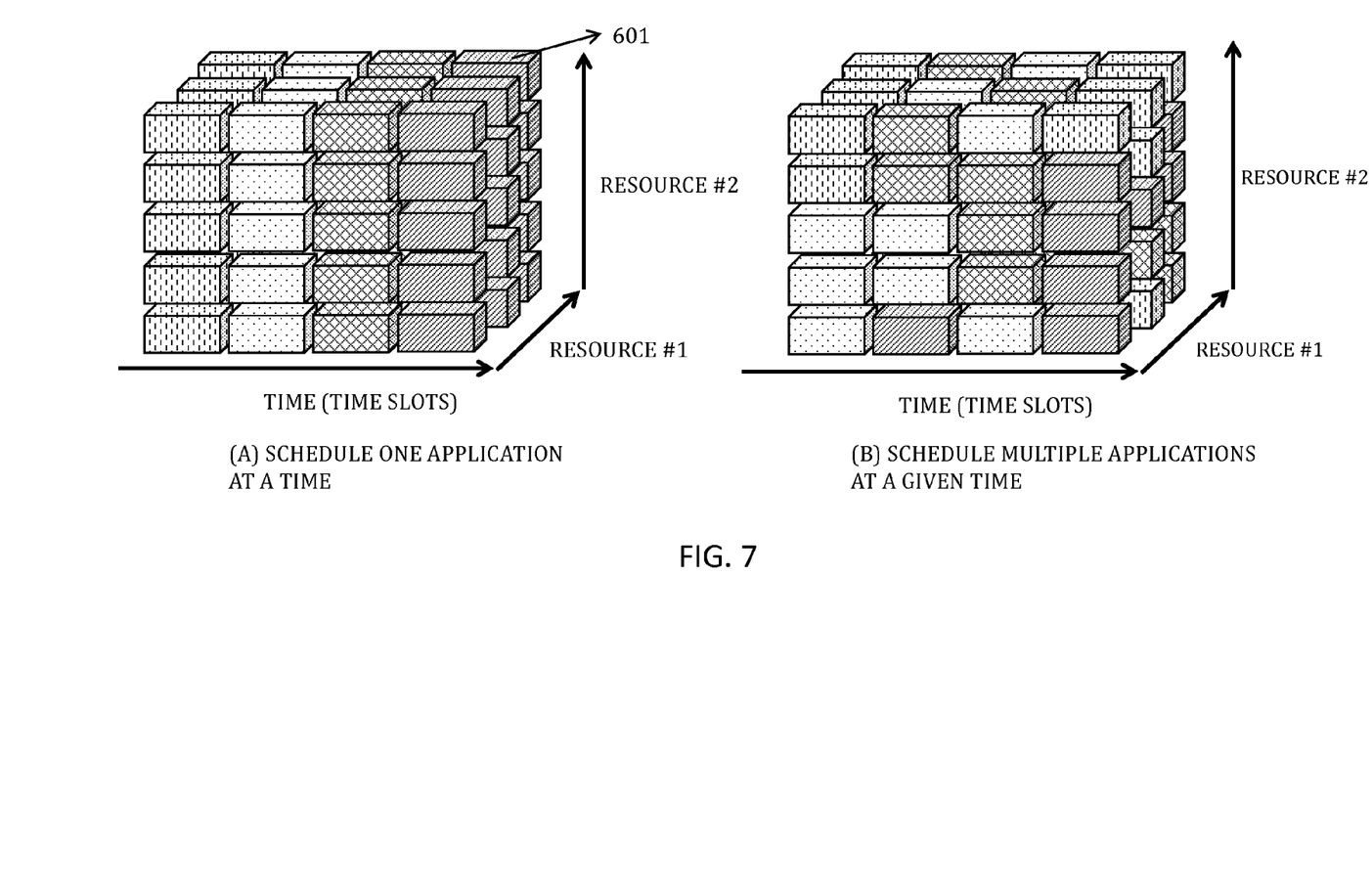
FIG. 7 illustrates how the proposed scheduler allocates system resources amongst a plurality of applications and/or users in the disclosed invention.

FIG. 7 illustrates how scheduling allocates system resources amongst active applications over a number of scheduling intervals. FIG. 7(a) illustrates a system where the intelligence unit 504 of the previous figure allocates all system resources to one application at a given scheduling interval. The system resources are multi-dimensional and may consist of one or more of the following: femtocell base station transmit power, transmission code space (if a CDMA based system is used), antennas (if the base station is furnished with multiple antennas), and the available bandwidth (if an FDMA, multi-carrier or OFDMA based system is used). If each of the available system resources are divided into unit size chunks, a multi-dimensional unit of system resources can be illustrated as 601. In that case, in FIG. 7(a), the entire multi-dimensional system resources space is allocated to one application at a given scheduling interval. This application is selected by the intelligence unit 504 of the previous figure. Similarly, FIG. 7(b) illustrates a system where it is possible to schedule multiple applications for service at a given scheduling interval. In this case, the intelligence unit 504 of the previous figure schedules which applications to serve at a given scheduling interval based on the current application ranks. Furthermore, the intelligence unit 504 also decides which application to allocate each multi-dimensional unit of system resources 601. In other words, all possible multi-dimensional units of system resources 601 are divided amongst all active applications so that the overall desired system goals are satisfied at every scheduling interval.

While the invention has been shown and described with reference to certain preferred and/or illustrative embodiments, it will be understood by those skilled in the art that various changes in the form and details may be made therein without departing from the spirit and scope of the invention as defined as the appended claims.

What is claimed is:

1. A scheduling method for a femtocell base station in a cellular communication system including the femtocell base station and at least one mobile station connected to the femtocell base station, said mobile station running a plurality of applications, the method as implemented in said femtocell base station comprising the steps of:

receiving data packets at said femtocell base station in said cellular communication system;

differentiating each of said received data packets based on its destination address and an associated application among said plurality of applications;

for each destination address, placing packets of each application in separate buffers, wherein applications are scheduled and one or more of the following system resources are allocated amongst scheduled applications: femtocell base station transmit power, transmission code space, antennas when said femtocell base station is equipped with multiple antennas, and available bandwidth, such that the following are jointly maximized using multiple objective optimization: goals of satisfaction of Quality of Service (QoS) requirements of each active application served by said femtocell base station, user and application priority level scaled fairness of service, and sum throughput of said femtocell base station;

transmitting head-of-line packets from each scheduled applications' buffer over a next transmission period; and updating QoS requirements, current QoS satisfaction/dissatisfaction levels, observed and average channel qualities for a user, and average observed data rates for each application in time for a next scheduling decision.

2. The scheduling method of claim 1, wherein said cellular system is any of the following: a CDMA based system, an FDMA based system, or an OFDMA based system.

3. The scheduling method of claim 1, wherein said destination address corresponds to a mobile user.

4. The scheduling method of claim 1, wherein said step of updating QoS requirements comprises updating any of, or a combination of, the following: maximum instantaneous and average data rates, minimum instantaneous and average data rates, average and maximum packet delays, estimated buffer fullness levels at user end, accurate buffer fullness level at user based on received feedback.

5. The scheduling method of claim 1, wherein said QoS satisfaction/dissatisfaction levels are measured using any of the following: a token counter, a satisfaction/dissatisfaction metric, or a metric measuring the deviation from a desired level.

6. The scheduling method of claim 1, wherein the femtocell base station schedules and allocates resources amongst plurality of active applications by calculating an application rank for each active application at each scheduling interval based on a nonlinear function of one or more of: its QoS requirements, its current QoS satisfaction/dissatisfaction levels, its observed channel qualities for a corresponding user, and average channel qualities for each application.

7. The scheduling method of claim 1, wherein user and application priority levels and/or minimum QoS parameter settings for the traffic of different users and/or traffic of different applications are set locally via a user interface.

8. The scheduling method of claim 7, wherein settings changed via said user interface are altered for a given period of time, after which settings return to their previous state.

9. The scheduling method of claim 1, wherein user and application priority levels and/or minimum QoS parameter settings for the traffic of different users and/or traffic of different applications are set based on previously entered data in a calendar program.

10. A scheduling apparatus for a femtocell base station, in a cellular communication system including the femtocell base station and at least one mobile station connected to the femtocell base station, said mobile station running at least two applications, the apparatus comprising, a plurality of buffers, each buffer storing data destined for a different active application or application type for each active user;

a channel quality collector logic that receives instantaneous channel quality indicators from each active user prior to each scheduling interval and keeps track of average channel quality for each active user and average observed data rate for each active application of each active user where averaging is handled using a sliding window over a pre-defined duration of time;

a user and application fairness logic that keeps a record of current QoS requirements of all active applications, as well as current satisfaction/dissatisfaction levels for QoS requirements of all applications, wherein a cellular operator or an owner of the femtocell set priority levels of all active users and applications or application types; and a scheduler for determining application rank of each active application and determining how system resources are divided amongst plurality of scheduled applications using a pre-determined scheduling algorithm;

wherein applications are scheduled and one or more of the following system resources are allocated amongst scheduled applications: femtocell base station transmit power, transmission code space, antennas when said femtocell base station is equipped with multiple antennas, and available bandwidth, such that the following are jointly maximized using multiple objective optimization: goals of satisfaction of Quality of Service (QoS) requirements of each active application served by said femtocell base station, user and application priority level scaled fairness of service, and sum throughput of said femtocell base station.

11. A scheduling method for a femtocell base station in a cellular communication system including the femtocell base station and at least one mobile device connected to the femtocell base station, each said mobile device running a plurality of associated applications or application types, the method as implemented in said femtocell base station comprising the steps of:

receiving data packets;

differentiating each of said received data packets based on said associated applications or application types and said mobile device;

placing said data packets in separate buffers, one for each application or application types;

scheduling transmission of said data packets over a next transmission period to optimize network resource utilization; and updating network resource utilization parameters used for said optimization for each of said applications or application types for the next scheduling decision;

wherein applications are scheduled and one or more of the following system resources are allocated amongst scheduled applications: femtocell base station transmit power, transmission code space, antennas when said femtocell base station is equipped with multiple antennas, and available bandwidth, such that the following are jointly maximized using multiple objective optimization: goals of satisfaction of Quality of Service (QoS) requirements of each active application served by said femtocell base station, user and application priority level scaled fairness of service, and sum throughput of said femtocell base station.

* * * * *